Patented May 10, 1927.

1,628,468

UNITED STATES PATENT OFFICE.

LEVI B. MILLER, OF LYNN, MASSACHUSETTS, ASSIGNOR TO GENERAL ELECTRIC COMPANY, A CORPORATION OF NEW YORK.

PROCESS OF PRODUCING VITREOUS SILICA.

No Drawing.   Application filed December 29, 1926.  Serial No. 157,870.

The present invention relates to the production of ingots or masses of vitreous silica suitable for the fabrication of various kinds of shaped articles.

Colorless, clear quartz crystals consist of substantially pure silica. When clear quartz crystals are subjected to fusion under ordinary conditions, that is, in contact with gases at atmospheric pressure, a product filled with minute gas bubbles is obtained whereas for most of the industrial applications of vitreous or fused silica, a clear, transparent product is desired. When clear, transparent quartz crystal is fused in a vacuum and the fusion then is subjected to pressure, bubbles or cavities in the product are reduced to a negligible residue.

Clear quartz crystal, however, is not distributed widely in nature. Although silica constitutes the largest part of the earth's crust and is found in an impure state almost anywhere, clear quartz crystal is sometimes obtainable only with great difficulty. Quartz crystal which is milky in appearance either wholly or in which clear and milky portions are intermingled, however, is abundant.

In accordance with my present invention a process is provided whereby the milkiness or opacity of the vitreous product produced by the fusion of milky quartz crystal can be materially reduced or eliminated.

In accordance with my invention, the milky or partly milky quartz crystal is heated to a temperature just below fusion preferably in vacuo, the material then is cooled to a temperature at which its structure becomes spongy or granulated and this product then is reheated in vacuo to fusion.

In carrying out my invention the milky quartz crystal is first freed from impurities, then is heated in a container consisting of graphite or other suitable material to a temperature just below fusion which varies with different varieities of quartz. Generally fusion occurs at about 1700° C. A vacuum furnace such as shown in Devers Patent 1,536,821 of May 5, 1925, may be used. The fusion temperature for any particular variety of quartz can be determined by trial. The regular crystalline structure of the quartz is destroyed at about 1600° C., or less if the heat is kept on long enough. By heating to such a temperature for a sufficient time the material assumes a new condition known as cristobalite which exists in two forms, alpha and beta, alpha being stable below about 270° C., and beta being stable above this. When this material is cooled to a temperature below 270° C. it again becomes altered, becoming frosty in appearance somewhat like loaf sugar, having changed over into alpha cristobalite.

The conversion of beta to alpha cristobalite preferably, but not necessarily, is carried on in a vacuum. When reheated to about 270° C. it changes back to beta cristobalite, but the granulated appearance remains. The cristobalite finally is fused in vacuo in a suitable furnace, such as disclosed, for example, in Devers Patent 1,536,-821. The beneficial effect of the conversion of milky quartz crystal to alpha cristobalite preparatory to fusion of the material in vacuo I believe can be ascribed to the opening of minute cavities as the crystalline form changes on going into the alpha state and the escape of gas therefrom before the fusing point is reached. It is not necessary to convert the quartz entirely to cristobalite to secure good results.

The vacuum-fused product may be subjected to any of the fabricating procedures now in use for the manufacture of various kinds of fused quartz products, for example, the plastic vacuum-fused product may be extruded into the form of tubes and rods by the use of the apparatus and the practice of the process described in my prior Patents 1,549,597 of August 11, 1925, and 1,562,115 of November 17, 1925.

What I claim as new an desire to secure by Letters Patent of the United States, is:—

1. The step in the process of treating cloudy or milky crystalline quartz before conversion to the vitreous state which consists in heating said material to a temperature just below fusion and cooling sufficiently to produce a granular structure.

2. The process of converting milky quartz crystal to a clear, vitreous condition which consists in converting said crystal in vacuo to alpha-cristobalite and then fusing in a vacuum.

3. The process of producing vitreous or fused quartz from crystal quartz which consists in heating said material to a temperature adjacent to but below about 1700° C., cooling the same to a temperature below 270° C., and finally fusing said material in a vacuum.

In witness whereof, I have hereto set my hand this 24th day of December, 1926.

LEVI B. MILLER.